Sept. 23, 1969      W. E. RHODES      3,469,157

CAPACITIVE SENSING DEVICE FOR DETECTING PASSAGE OF PARTICLES

Filed April 18, 1968

INVENTOR

WILLIAM E. RHODES

BY *Birch & Birch*

ATTORNEY

United States Patent Office 3,469,157
Patented Sept. 23, 1969

3,469,157
CAPACITIVE SENSING DEVICE FOR DETECTING PASSAGE OF PARTICLES
William E. Rhodes, Columbus, Ohio, assignor to Robertshaw Controls Company, Richmond, Va., a corporation of Delaware
Filed Apr. 18, 1968, Ser. No. 722,306
Int. Cl. H01g 7/06
U.S. Cl. 317—246     18 Claims

ABSTRACT OF THE DISCLOSURE

A detector unit has conductively coupled to it a capacitive sensing unit. The sensing unit has two conductive plates with a dielectric spacer physically bonding and separating the plates. The capacitive unit is of annular shape and is hinged so that it may be placed around a tube to detect the passage of free droplets or particles.

---

This invention relates to capacitance sensing means, and more particularly to such sensing means for adapting proximity detector units and the like for the detection of the passage of liquid droplets or other discrete particles through tubes, pipes or other defined paths of travel.

It is an object of this invention to provide new and novel capacitance probe structures readily connectable to a proximity detector unit for adapting such unit to the detection of the passage of liquid droplets and the like.

Another object of this invention is to provide new and novel capacitance probe structures which are adapted to removably receive a fluid conduit internally thereof.

Another object of this invention is to provide new and novel capacitance probe structures which are adapted to removably receive a fluid conduit internally thereof, and which obviate the need to disturb the orientation of the conduit.

Yet another object of this invention is to provide a new and novel capacitance probe structure for proximity detector units and the like having a symmetrical internally disposed fluid passage therethrough for adapting said units to the detection of liquid droplets or the like.

Yet another object of this invention is to provide a new and novel capacitance probe structure for proximity detector units wherein one of the electrodes has a common ground connection with an associated proximity detector unit.

Yet another object of this invention is to provide a new and novel capacitance probe and proximity detector unit structure which is both physically and electrically stable.

Yet another object of this invention is to provide a new and novel capacitance probe structure for proximity detector units including a tuning means for selectively adjusting the probe capacitance.

These and other objects of this invention will become more fully apparent with reference to the following specification and drawings which relate to a preferred embodiment of the invention.

Figure 1:
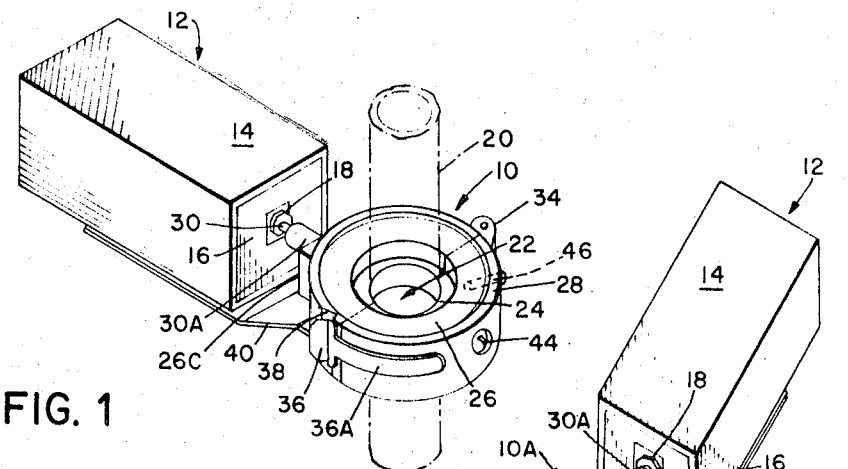
FIGURE 1 is a top perspective of the capacitance probe and proximity detector housing structure of the present invention with the probe enclosing a fluid conduit.

Referring in detail to the drawings and specifically to FIG. 1 thereof, a capacitance probe 10 of the present invention is shown mounted on a proximity detector unit 12, the latter comprising an outer conductive housing 14 with a wall portion thereof defined by a dielectric base plate 16 having a conductive coupling socket 18 or the like symmetrically disposed therein.

The capacitance probe 10 is shown encompassing the periphery of a fluid conduit 20 through which the passage of fluid droplets or particulate materials may be monitored by the probe 10 and sensing unit 12.

Alternatively, the axial bore 22 of the capacitance probe 10 can effect monitoring of free droplets or particles passing therethrough if the environment so requires.

Figure 2:
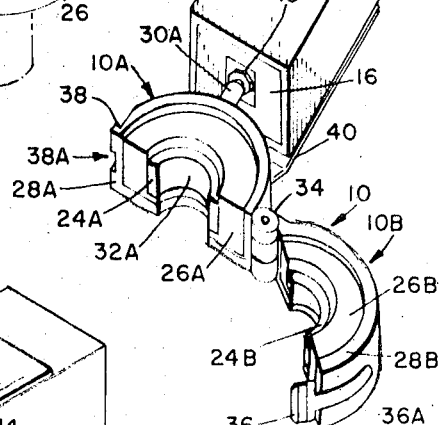
FIGURE 2 is a top perspective of the structure of FIG. 1 with the capacitance probe in an open condition.
Figure 3:
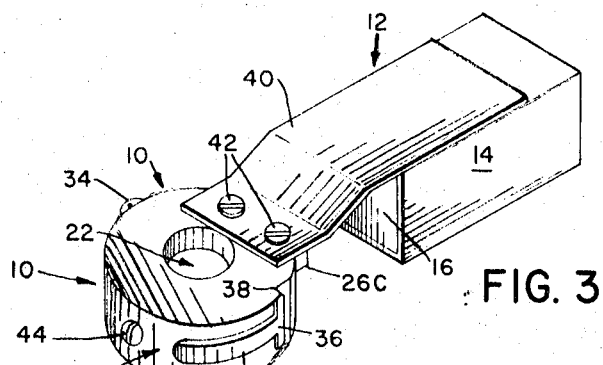
FIGURE 3 is a bottom perspective of the structure of FIG. 1 without the fluid conduit in the capacitance probe structure.
Figure 4:
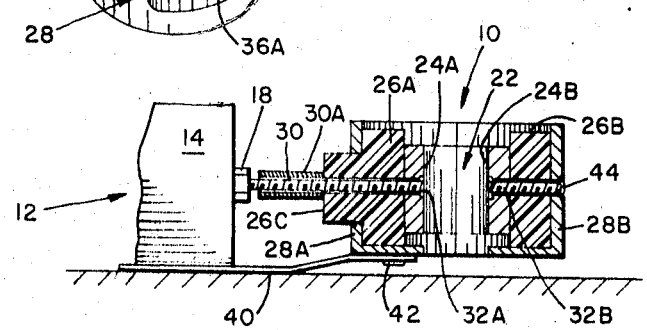
FIGURE 4 is a partial side elevation in partial cross-section of the structure of FIG. 1.

The axial bore 22 is defined along a major portion of its length by a cylindrical inner electrode 24, which, referring additionally to FIGS. 2, 3 and 4, is formed from semicylinders 24A and 24B.

The inner electrode 24 (24A, 24B) is nested within a cup-shaped dielectric sheath 26 having symmetrical halves 26A and 26B juxtaposed with the inner electrode halves 24A and 24B, respectively.

An outer, cup-shaped, electrode 28, formed of symmetrical halves 28A and 28B externally and coextensively juxtaposed with the halves 26A and 26B, respectively, of the dielectric sheath 26, comprises the external shell of the capacitance probe 10. The lower face of the outer electrode 28 and the lower extremity of the dielectric sheath 26 are bored out in registry with the axial bore 22 and define the lower extremity of the latter.

The upper surface of the capacitance probe 10, as clearly shown in FIGS. 1, 2 and 4, is exposed to show the upper concentric peripheries of the inner and outer electrodes 24 and 28 and the dielectric sheath 26. The upper periphery of the sheath 26 is below that of the outer electrode 28 and the upper periphery of the inner electrode 24 is below that of the dielectric sheath 26, effecting a two-stage, countersunk cross-section as most clearly shown in FIG. 4.

The inner electrode 24 is electrically connected with the conductive coupling 18 on the proximity unit 12 by means of an electrically conductive, threaded coupling shank 30, which extends through the dielectric sheath 26 into a threaded first radial bore 32A in the first half 24A of the inner electrode 24.

A second radial bore 32B is provided in the second half 24B of the inner electrode 24, diametrically aligned with the first bore 32A. This provides physical symmetry and substantially balanced electrostatic characteristics between the first and second halves 24A and 24B of the inner electrode 24.

The conductive threaded shank 30 is electrically isolated from the outer electrode 28 by a radial extension 26C of the first dielectric sheath half 26A extending through the wall of the first half 28A of the outer electrode 28 toward the proximity unit 12. A locking sleeve 30A is externally threaded on the coupling shank 30 and abuts the sheath extension 28C to hold the sensing head 10 in a fixed position on the shank 30.

The outer electrode 28 includes a vertically disposed hinge structure 34 between its first and second halves 28A and 28B, as best shown in FIGS. 1, 2 and 3; and a diametrically opposed, peripheral spring clip 36 extends from the second half 28B into holding engagement with a detent 38 in the outer periphery of the first half 28A. Thus, the sensing head 10 is divided into first and second halves 10A and 10B hinged together by the hinge 34 and maintained in a closed operable configuration by the spring clip 36 and cooperating detent 38.

The detent 38 is relieved to form a peripheral slot 38A for receiving the shank portion 36A of the spring clip 36 in a substantially flush relationship with the outer periphery of the outer electrode 28, when the sensing head 10 is in a closed configuration.

The outer electrode 28 is referenced to the same ground potential as the proximity unit 12 by means of a conductive plate 40 extending from the outer conductive housing 14 to the lower surface of the first half 28A of the outer electrode 28. The plate 40 also provides structural support to the sensing head 10 in addition to that provided by the coupling shank 30. The plate 40 is affixed to both the housing 14 of the proximity unit 12 and the first half 28A of the outer electrode 28 by suitable means such as hold-down screws 42 (FIGS. 3 and 4) solder or the like.

The outer half 10B of the sensing head 10 is held in assembled relationship by a threaded screw or fastener 44 which is radially disposed through the second half 28B of the outer electrode 28 and the second half 26B of the dielectric sheath 26 into the second radial bore 32B in the inner electrode 24 (second half 24B). A radially displaceable slug 46, disposed at an angle of approximately forty-five degrees (45°) from the dielectric fastener 44 will vary the electrostatic coupling between the inner and outer electrodes 24 and 28 to permit selective changes of such characteristics of the sensing head 10 as the sensitivity to droplet or particle size and the like. The slug 46, as shown in FIG. 1, extends through the outer electrode second half 28B and dielectric sheath second half 26B into proximity with the second half 24B of the inner electrode 24.

In operation, a drop of fluid substance or a particle of matter axially traversing the bore 22 will effect a change in capacitance of the sensing head 10, which will be detected by the proximity detector unit 12 via the conductive coupling shank 30 and conductive coupling 18.

Where passage of drops or particles through the conduit 20 is to be monitored, the sensing head halves 10A and 10B are opened as shown in FIG. 2, moved adjacent the conduit 20 and closed together by means of the hinge 34, spring clip 36 and detent 38 to contain the tube 20 prior to the monitoring operation.

The conductive coupling shank 30 and conductive plate 40 may be provided with any suitable configuration to effect extension of the sensing head 10 from the proximity detector unit 12 to the point at which the monitoring of the passage of drops or particles is to be effected.

As can be readily seen from the foregoing specification and drawings, this invention provides new and novel capacitance probe structures for adapting proximity detectors or the like to detect the passage of liquid drops or discrete particles of matter through various defined paths of travel, said probe structures having a wide range of environmental adaptivity. Further, this invention provides such probe structures with the added advantage of selective adjustability of response and means effecting a common ground connection between such structures and an associated proximity detector unit.

While only several specific embodiments are hereinbefore illustrated and described, it is to be expressly understood that this invention is not intended to be limited to the exact formations, construction or arrangement of parts as illustrated and described because various modifications may be developed in putting the invention to practice within the scope of the appended claims.

What is claimed is:

1. As an article of manufacture, an integral conductive exterior housing and capacitance sensing element for condition monitoring devices adapted to sense the passage of discrete particles along a predetermined path comprising a conductive housing including a dielectric base plate as an external wall portion thereof, electrically conductive coupling means secured to said base plate, an electrically conductive extended support element conductively coupled with said coupling means, and a sensing head attached to said support element remote from said coupling means; said sensing head means comprising conductive means defining a predetermined path of travel therethrough adapted to permit the passage of discrete particles and having a portion thereof conductively coupled with said support means, and said conductive means comprising first and second substantially symmetrical sections, and hinge means interconnecting said first and second sections.

2. The invention defined in claim 1, wherein said article further includes a common electrical connection between said conductive housing and a selected other portion of said conductive means; said common electrical connection comprising a common ground connection between said housing and said sensing head.

3. The invention defined in claim 1, wherein, in each of said sections, said conductive means further comprises first and second spaced electrode means of complimentary configuration in each of said sections; said sensing head further includes dielectric spacer means physically bonding said first and second electrode means in each of said sections into an integral structure, and electrically separating one from the other; and wherein said portion of said conductive means comprises one of said electrode means in at least one of said sections conductively coupled to said support element; the other of said electrode means including said hinge means and a retaining means cooperating with said hinge means selectively maintaining said sections in juxtaposition about said predetermined path of travel.

4. The invention defined in claim 3, wherein, between said other of said electrodes and said conductive housing, is provided a common electrical connection comprising a common ground connection therebetween.

5. The invention defined in claim 3, wherein the first of said electrodes comprises an outer shell for each section of said sensing head and has an open-ended cup-shaped cross section with said path of travel extending through the closed end thereof; wherein said dielectric spacer means is of like configuration internally nested in said first electrode; and wherein said second electrode is nested within said spacer means and defines the major portion of said path of travel; said electrodes and said spacer means being symmetrically maintained by said hinge means and said retaining means to effect a substantially integral symmetrical structure, with like parts of each section juxtaposed in registry.

6. The invention defined in claim 1, wherein said sections are partially separable about said hinge means, adapting same to receive a tubular conduit in said path of travel; and wherein said retaining means, in cooperation with said hinge means, effects substantially integral sensing head structure adapted to fully contain such a tubular conduit in said path of travel.

7. The invention defined in claim 1, wherein said conductive means comprises an outer electrode including said hinge means, an inner electrode disposed within said outer electrode; wherein said sensing head includes a dielectric spacer between said inner and outer electrodes, electrically isolating one from the other, and extending through a wall portion of said outer electrode, and wherein said support element extends through said dielectric spacer and said wall portion of said outer electrode into conductive engagement with said inner electrode.

8. The invention defined in claim 1, wherein said conductive means comprises an outer electrodes including said hinge means, an inner electrode disposed within said outer electrode; wherein said sensing head includes a dielectric spacer between said inner and outer electrodes, electrically isolating one from the other, and extending through a wall portion of said outer electrode; wherein said support element extends through said dielectric spacer and said wall portion of said outer electrode into conductive engagement with said inner electrode; and, further, wherein said article includes a common electrical connection, extending from said conductive housing to said outer electrode, comprising a common ground connection between said housing and said sensing head.

9. For use with a sensing device including a conductive exterior housing with a dielectric base plate as an exterior wall portion thereof and a first electrically conductive coupling means secured to said base plate, a capacitance sensing means adapted to sense the passage of discrete particles along a predetermined path comprising an electrically conductive extended support element adapted to be removably mounted on said base plate at said first coupling means comprising an electrically conductive extended support element having an integral second conductive coupling means thereon adapted to be conductively coupled with said first coupling means, and a sensing head attached to said support element remote from said second coupling means, said sensing head means comprising conductive means defining a predetermined path of travel therethrough adapted to permit the passage of discrete particles and having a portion thereof conductively coupled with said support means; and said conductive means comprising first and second substantially symmetrical sections, and hinge means interconnecting said first and second sections.

10. The invention defined in claim 9, wherein said conductive means includes an electrically conductive extension on a selected other portion thereof, said conductive extension being adapted to provide a common ground connection between said sensing means and an associated sensing device.

11. The invention defined in claim 9, wherein, in each of said sections, said conductive means further comprises first and second spaced electrode means of complimentary configuration in each of said sections; said sensing head further includes dielectric spacer means physically bonding said first and second electrode means in each of said sections into an integral structure, and electrically separating one from the other; and wherein said portion of said conductive means comprises one of said electrode means in at least one of said sections conductively coupled to said support element; the other of said electrode means including said hinge means and a retaining means cooperating with said hinge means selectively maintaining said sections in juxtaposition about said predetermined path of travel.

12. The invention defined in claim 11, wherein an electrically conductive extension is provided on the other of said electrodes, said conductive extension being adapted to provide a common ground connection between said conductive means and an associated sensing device.

13. The invention defined in claim 11, wherein the first of said electrodes comprises an outer shell for each section of said sensing head and has an open-ended cup-shaped cross section with said path of travel extending through the closed end thereof; wherein said dielectric spacer means is of like configuration internally nested in said first electrode; and wherein said second electrode is nested within said spacer means and defines the major portion of said path of travel; said electrodes and said spacer means being symmetrically maintained by said hinge means and said retaining means to effect a substantially integral symmetrical structure, with like parts of each section juxtaposed in registry.

14. The invention defined in claim 9, wherein said sections are partially separable about said hinge means, adapting same to receive a tubular conduit in said path of travel; and wherein said retaining means, in cooperation with said hinge means, effects substantially integral sensing head structure adapted to fully contain such a tubular conduit in said path of travel.

15. The invention defined in claim 9, wherein said conductive means comprises an outer electrode including said hinge means, an inner electrode disposed within said outer electrode; wherein said sensing head includes a dielectric spacer between said inner and outer electrodes, electrically isolating one from the other, and extending through a wall portion of said outer electrode, and wherein said support element extends through said dielectric spacer and said wall portion of said outer electrode into conductive engagement with said inner electrode.

16. The invention defined in claim 15, wherein said inner and outer electrodes are of cylindrical configuration; and wherein said inner electrode includes first and second aligned opposed radial bores in the periphery thereof, said first radial bore receiving said support element and said second radial bore receiving dielectric retaining means extending from said outer electrode through said dielectric spacer.

17. The invention defined in claim 9, wherein said conductive means comprises an outer electrode including said hinge means, an inner electrode disposed within said outer electrode; wherein said sensing head includes a dielectric spacer between said inner and outer electrodes, electrically isolating one from the other, and extending through a wall portion of said outer electrode, wherein said support element extends through said dielectric spacer and said wall portion of said outer electrode into conductive engagement with said inner electrode; and, further, wherein said sensing means includes an electrically conductive extension on said outer electrode, said extension adapted to provide a common ground connection between said outer electrode and an associated sensing device.

18. The invention defined in claim 17, wherein said inner and outer electrodes are of cylindrical configuration; and wherein said inner electrode includes first and second aligned opposed radial bores in the periphery thereof, said first radial bore receiving said support element and said second radial bore receiving dielectric retaining means extending from said outer electrode through said dielectric spacer.

References Cited
UNITED STATES PATENTS 3,372,319  3/1968  Rhodes _____ 317—256

ELLIOT A. GOLDBERG, Primary Examiner

U.S. Cl. X.R.

317—256; 324—61, 71